Oct. 13, 1964

J. R. WATSON 3,152,527

BALLISTICS CAMERA AND MOUNT

Filed Oct. 31, 1960

6 Sheets—Sheet 1

INVENTOR.
JESSE R. WATSON
BY

ATTORNEY.

Oct. 13, 1964  J. R. WATSON  3,152,527
BALLISTICS CAMERA AND MOUNT
Filed Oct. 31, 1960  6 Sheets-Sheet 2
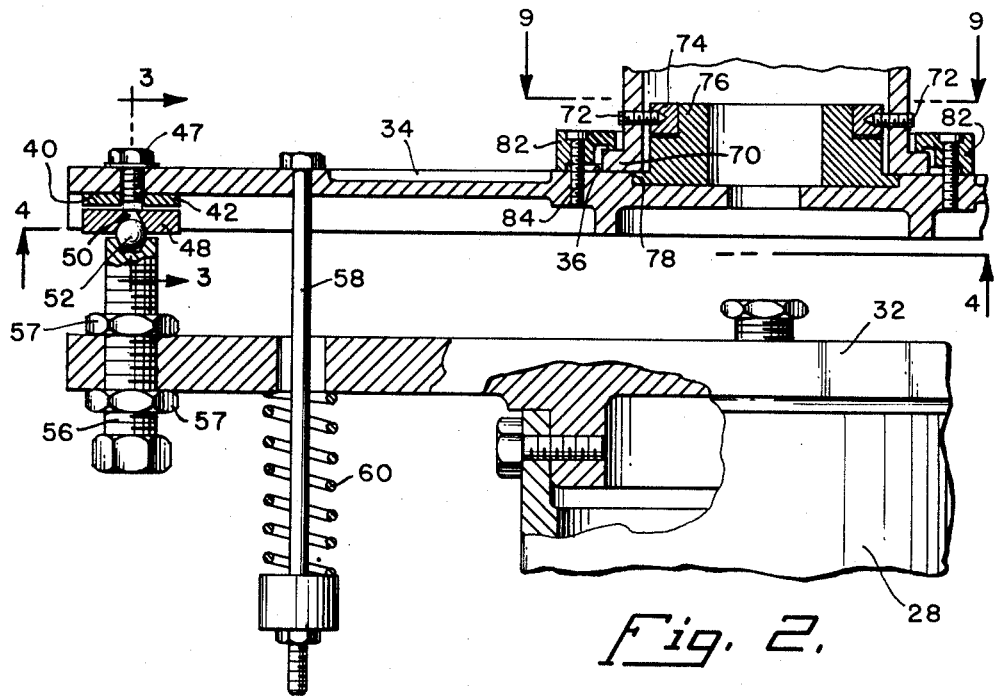
Fig. 2.
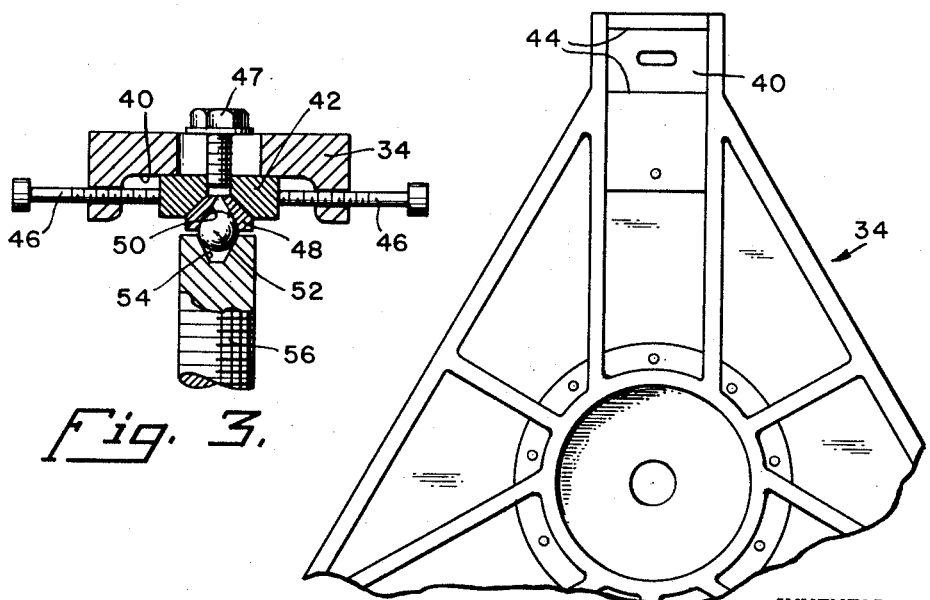
Fig. 3.
Fig. 4.
INVENTOR.
JESSE R. WATSON
BY
ATTORNEY.

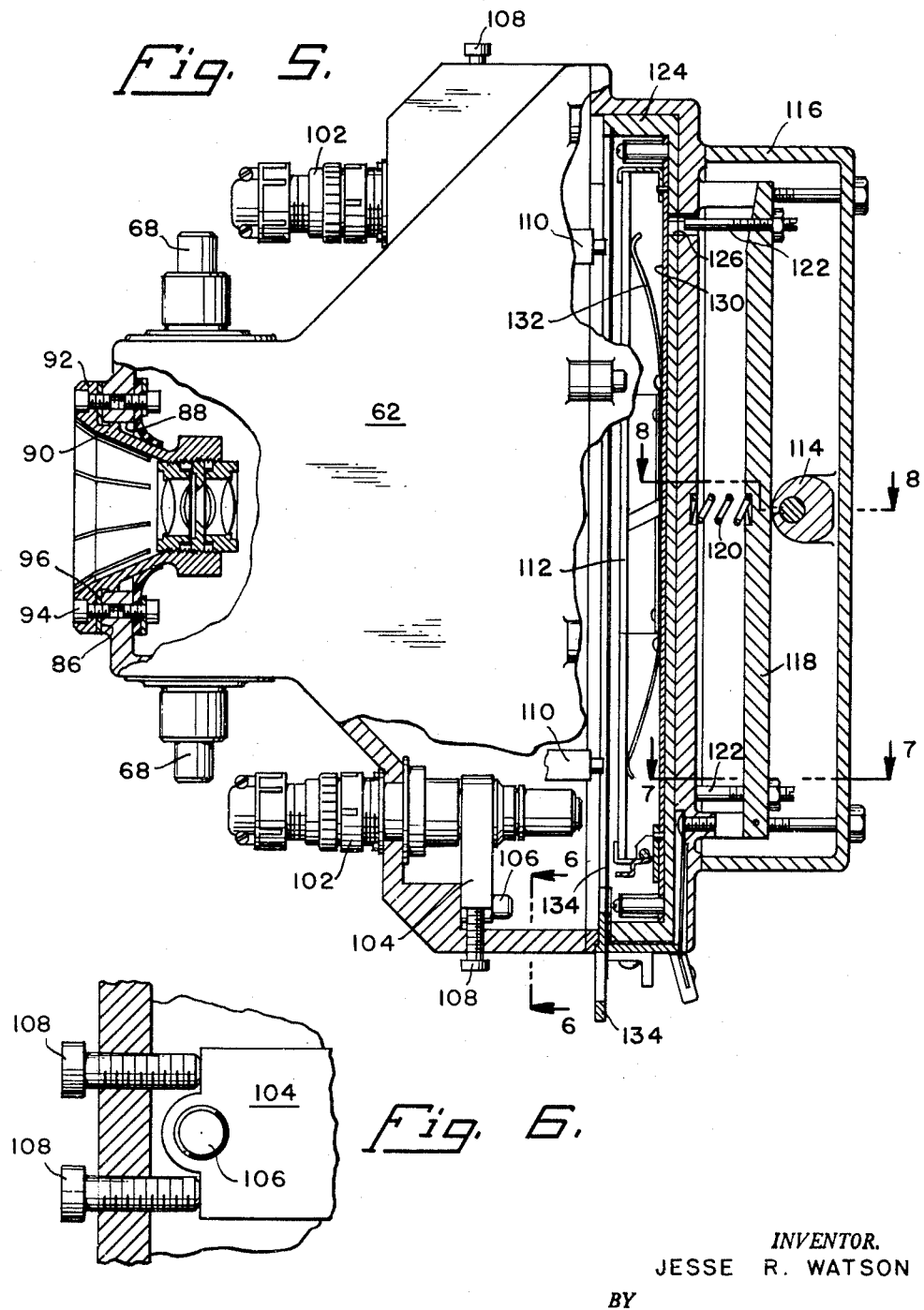

Oct. 13, 1964  J. R. WATSON  3,152,527
BALLISTICS CAMERA AND MOUNT
Filed Oct. 31, 1960  6 Sheets-Sheet 4

INVENTOR.
JESSE R. WATSON
BY
*V. C. Muller*
ATTORNEY.

INVENTOR.
JESSE R. WATSON
BY
ATTORNEY.

Oct. 13, 1964   J. R. WATSON   3,152,527
BALLISTICS CAMERA AND MOUNT
Filed Oct. 31, 1960   6 Sheets-Sheet 6

INVENTOR.
JESSE R. WATSON
BY
*J.C. Muller*
ATTORNEY.

United States Patent Office 3,152,527
Patented Oct. 13, 1964

3,152,527
BALLISTICS CAMERA AND MOUNT
Jesse R. Watson, 2107 Minoru Drive, Altadena, Calif.
Filed Oct. 31, 1960, Ser. No. 114,573
8 Claims. (Cl. 95—1.1)
(Granted under Title 35, U.S. Code (1952), sec. 266)

The invention described herein may be manufactured and used by or for the Government of the United States of America for governmental purposes without the payment of any royalties thereon or therefor.

This invention relates to aeroballistic ranges for determining the flight characteristics of missiles and more particularly to camera apparatus employed for photographing a series of instantaneous positions of a missile relative to a known range line to enable determination of its trajectory in space.

One of the objects of the invention is to provide improvements in cameras and their adjustable supports for accurately locating a plurality of cameras along a ballistic range.

Another object is to provide temperature compensating supports for camera components which are constructed to maintain the scale of an image on a photographic plate and the distance between reference or fiducial marks on the plate constant irrespective of the camera temperature at the time of exposure.

Further objects are to provide various novel camera components.

Figure 1:
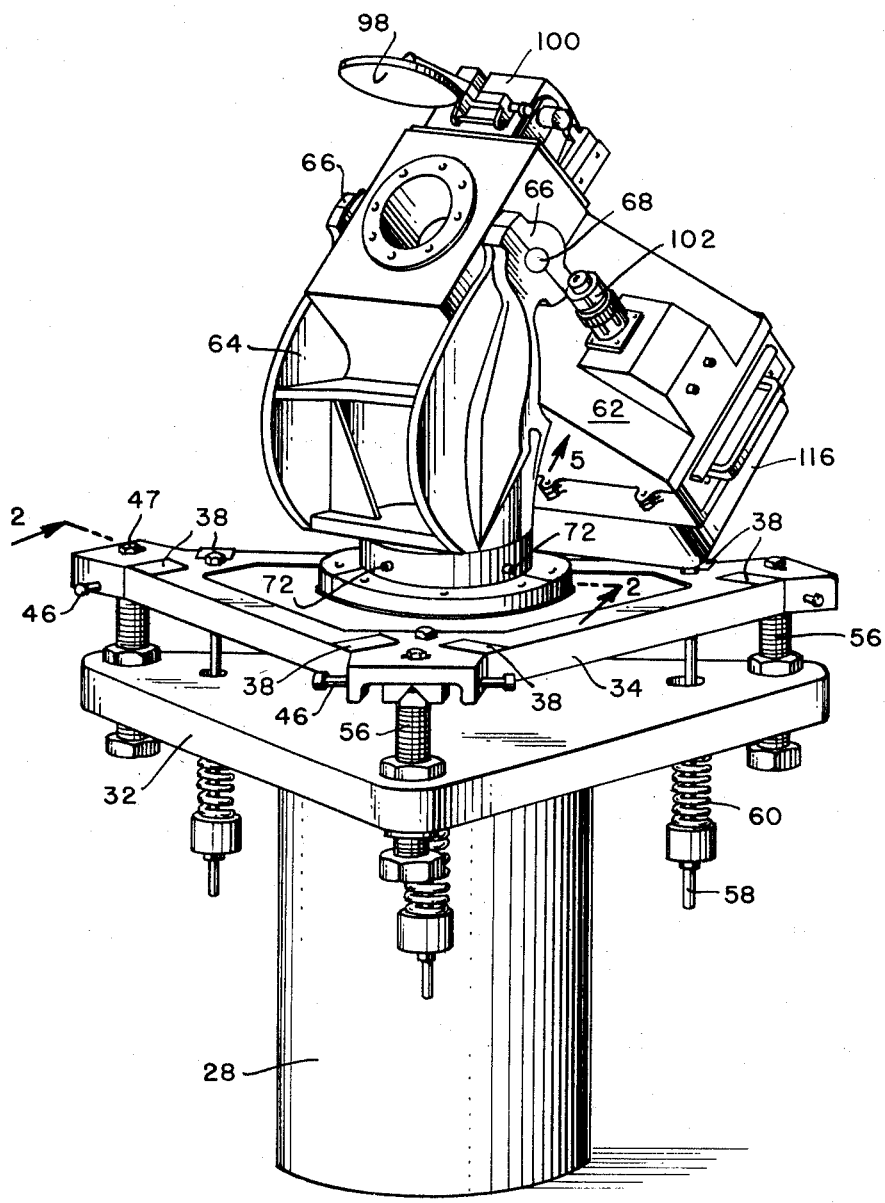
Figure 7:
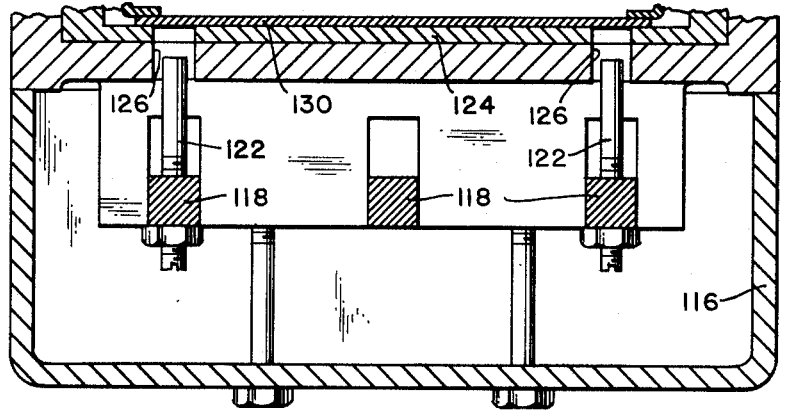
Figure 8:
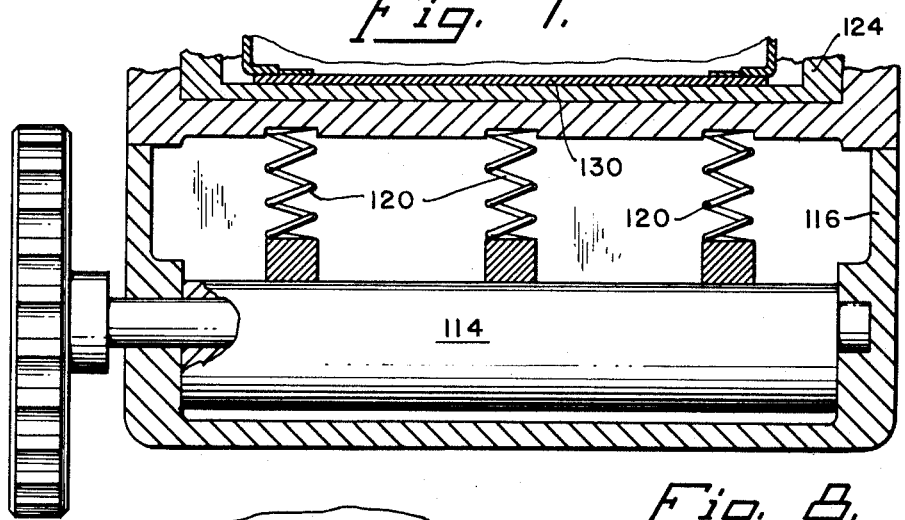
Figure 9:
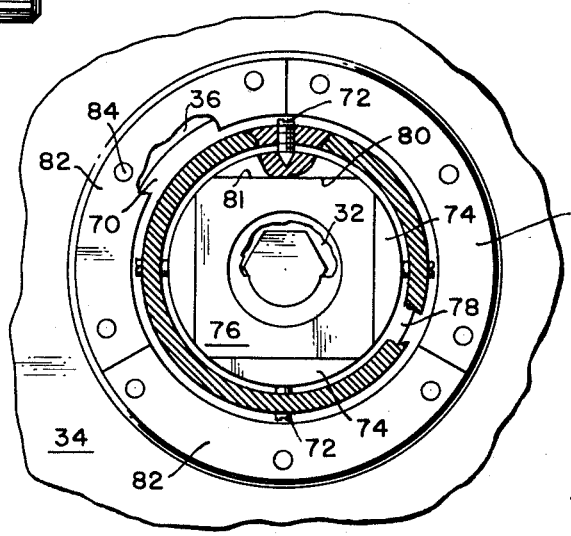
Figure 10:
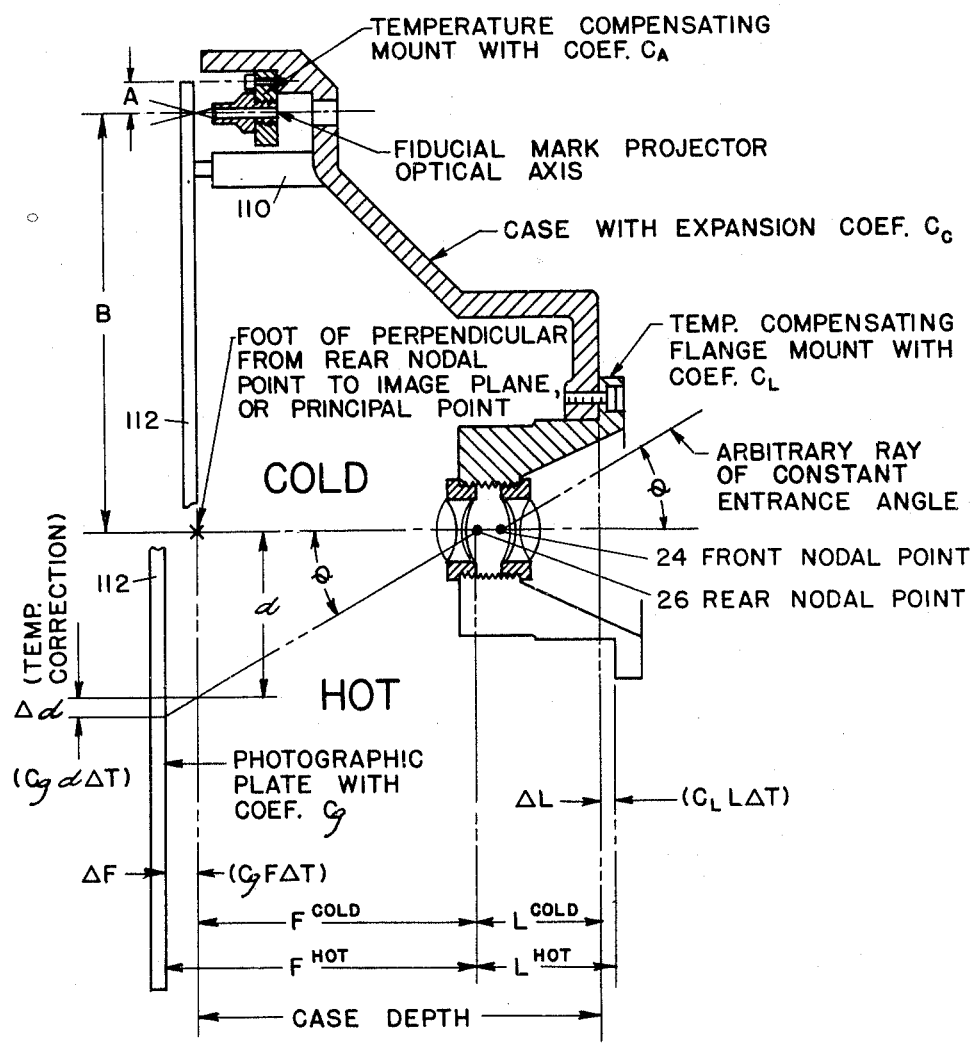
Figure 11:
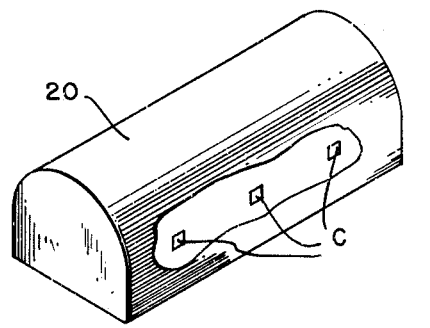
Figure 12:
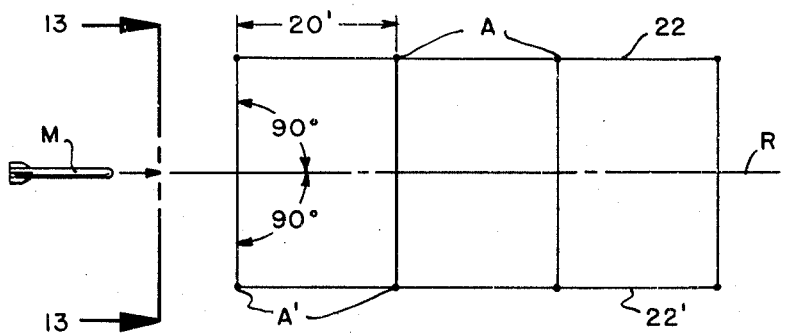
Figure 13:
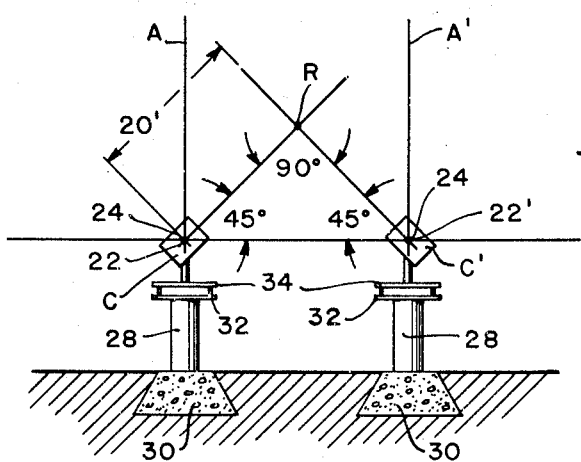

Still further objects, advantages and salient features will become more apparent from the description to follow, the appended claims and the accompanying drawing in which:

FIG. 1 is an isometric view of a camera forming the subject of the invention;
FIG. 2 is a section taken on line 2—2, FIG. 1;
FIG. 3 is a section taken on line 3—3, FIG. 2;
FIG. 4 is a section taken on line 4—4, FIG. 2;
FIG. 5 is an enlarged plan of FIG. 1 viewed in the direction of arrow 5, portions being broken away;
FIG. 6 is an enlarged section taken on line 6—6, FIG. 5;
FIG. 7 is a section taken on line 7—7, FIG. 5;
FIG. 8 is a section taken on line 8—8, FIG. 5;
FIG. 9 is a section taken on line 9—9, FIG. 2, portions being broken away;
FIG. 10 is a partial section through the optical axis of the camera, portions being illustrated diagrammatically;
FIG. 11 is a perspective of a building housing the apparatus of FIGS. 1 to 10;
FIG. 12 is a partial top plan of the geometric arrangement of the aeroballistic range within the building of FIG. 11; and
FIG. 13 is a section of the range taken on line 13—13, FIG. 12.

For a better understanding of the purpose and utility of camera apparatus to be subsequently described, reference is first made to FIGS. 11 to 13 of the drawing which illustrate a suitable elongated building 20 which houses the range and from which light may be excluded and the atmosphere controlled as to temperature and humidity. The coordinates of the range comprise a horizontal range line R and two parallel lines 22, 22' spaced equi-distance from the range line along which vertical or azimuth axes A, A' are located at intervals of 20.000 feet in opposed pairs, each pair being in a vertical plane perpendicular to the range line. Each pair of opposed azimuth axes determine the position of a pair of cameras C, C', the optical axes of which are perpendicular to each other, and to the range line and which intersect at a point on the range line. This establishes an upwardly inclined optical axis at 45° to the horizontal.

The cameras, to be subsequently described, are located in such manner that the front nodal points 24 of the lenses of all cameras lie in a horizontal plane with the front nodal point of each camera also lying on a corresponding azimuth axis. The distance between each front nodal point and the range line is also 20.000 feet. Since the manner of locating the various coordinates may vary as desired and will be understood in the art of precise surveying such details are omitted in the interests of clarity. The use of theodlites is suggested, however, along with an invar tape with necessary hairline markings thereon which accurately measure various sides of the triangles involved in the survey, which lines may be located with suitable microscopes which may be disposed on the cameras or their supports or other appropriate optical instruments. It is desired to determine the position of a point in the space around the range line to an accuracy of .01 inch. To meet such condition, it can be shown that the positions of all front nodal points must be known to within approximately .01 inch and the orientation of the optical axes to within approximately 3 seconds of arc. Also, the image distance from a rear nodal point 26 must be known to better than .001 inch and the image position measurements on the photographic plate to about .0001 inch or approximately 3 microns. As will subsequently appear, various adjustment features enable this degree of accuracy and facilitate the proper orientation of the various cameras along the range.

In the operation of the laboratory, a missile M is fired adjacent the range line and photographs taken of its flight by "stopping" it with microflash illumination, the duration of flashes being of the order of one microsecond, so that several exposures may be obtained on each photographic plate. From the images on the plates of the various cameras, the exact position of the missile with respect to the range line may be mathematically determined.

Since all of the cameras are as identical as is possible to construct them, a description of one will suffice for all. Each camera is supported by a column 28 (FIGS. 1 and 13) imbedded in a massive concrete pier 30 to which is affixed a base plate 32, the top machined surfaces of all base plates being leveled and located in approximately the same plane. These plates provide permanent immovable supports relative to which the various cameras may be adjusted to place them in desired exact relative position.

Above the base plate is disposed a generally triangular leveling plate 34, having a machined flat central surface 36 and pairs of coplanar surfaces 38 adjacent each corner of the plate on which a precision level may be supported to plumb the azimuth axis, and for checking stability and permanence of the camera setting from time to time. The lower surface 40 of each corner of the plate is machined flat to receive the top surface of a V-block 42 which may be adjusted tangent to a radius of the plate along a guideway 44 by a pair of screws 46 and locked in position by a screw 47. Block 42 slideably rests upon a mating V-block 48, which is provided with a conical socket 50 which rests upon a steel ball 52, the ball resting in a similar socket 54 in the top of a screw 56 which threadedly engages the base-plate and which may be locked by check nuts 57. As will be apparent, each corner of the leveling plate may be individually raised or lowered by a screw 56 and each corner of the leveling plate may be shifted horizontally by a V-block arrangement, shifting of any one V-block arrangement, permitting the others to shift to a position of equilibrium. A rod 58, loaded by a spring 60, is disposed adjacent each corner and resiliently urges the leveling plate downwardly.

The camera case 62 is directly supported by a trunnion support member 64 having aligned split trunnion journals 66 which received axially aligned mating shafts or pintles 68 on the camera case which permit angular adjustments of the camera about a horizontal axis. The lower end of this member is provided with a flange 70 which rests upon surface 36 and may be shifted horizontally by four equiangularly spaced screws 72 which engage a like number of arcuate shoes 74 surrounding a collar 76 having a flange 78 accurately fitting a circular counterbore in the top of the leveling plate. The inner surfaces 80 of the shoes are flat and engage four mating orthogonal flat surfaces 81 on the collar. A plurality of arcuate clamps 82 engage the flange and upon tightening of screws 84 the trunnion support member may be fixed in a desired horizontal position on the base plate.

The camera is of the fixed focus box type supported by the trunnion support by a pair of axially aligned pintles 68, previously referred to, the axis of which intersects the camera optical axis, the front nodal point also being at such intersection. The forward end of the camera case is provided with a flat face 86 and a bore 88 which accurately receives the lens mount 90 which is provided with a flange 92 secured to the front face of the camera by a plurality of screws 94, a plurality of stacked shims 96 being disposed between the flange and case to facilitate axial adjustment of the lens and its mount to place the front nodal point on the trunnion axis. The lens is a Goerz "Aerotar," 6 inch focal length, F6.8, wide angle aerographic. The shutter system is of the lens cap type, employing a pivoted lens cap 98 which may be moved to and from a position over the lens by a motor 100 which may be cycled to operate as desired. A pair of fiducial mark projectors 102 are affixed to the case, each by a support 104 which is pivotally secured to the case by a lockable pivot screw 106 and a pair of jack screws 108 with which the projector support may be adjusted around the axis of the pivot screw. When properly adjusted, the projectors project pin points of light .001 to .002 inch in diameter on the photographic plate, to be subsequently described, the points lying on a horizontal line passing through the optical axis and spaced to each side of same. The range line is thus located on the plate by these fiducial marks. Since the precise position of the optical axis between the fiducial marks will also be known it is apparent that the position of the missile relative to the range line may be mathematically determined from the image on the plates of a pair of opposed cameras at a station.

The focal plane of the camera is established by four hardened pins 110 rigidly secured to the camera case and disposed in a rectangular pattern equidistant from the lens axis, the rear faces of the pins being ground flat in a plane parallel to the front face of the camera and also perpendicular to the lens axis. The front face of the photographic plate 112, near its four corners, engages these pins. The apparatus for maintaining the plate in engagement with the pins comprises a rotatable cam 114 journaled in the case back 116 which engages three parallel pivoted levers 118, the outer two of which are pivoted to the case back at the same ends and the central lever being similarly pivoted at its opposite end. Each lever is urged by a spring 120 and near its end, opposite to its pivot, is carried a pin 122, the forward ends of the three pins forming a floating three pin pressure system for effecting movement of the plate into engagement with the four locating pins 110 previously described.

The plate holder 124 is designed to hold 4 x 10 inch glass plates. The plate holder assembly consists of an aluminum casting machined inside and out to form a shallow open-faced box. The back of this housing contains three holes 126 to permit entry of pins 122 which push the photographic plate forward. These pins push against a false bottom plate 130 held by spring pressure against the bottom of the housing. This plate fits closely but freely against the sides of the housing and carries the necessary brackets and springs for holding the photographic plate. Two springs 132 apply pressure behind the photographic plate at four points such that, when the plate holder sub-assembly is moved forward until the plate touches the plate locating line 110, the pressure points are just opposite the pins and hold the plate firmly in the plane defined by the plate locating pins without distorting the plate. The dark slide 134 functions in the usual manner.

The photographic plate is .125 inch thick and ground flat to within .001 inch to which is preferably applied as fine grain emulsion as possible, consistent with the film speed required.

It is an important requirement of the camera that a ray of light having given values of angular coordinates in the object field always impinges upon the photographic plate at the same point in the internal coordinate system of the camera. Since a change of temperature would change the scale of the internal coordinate system of the camera, it is evident that the scale factor of the camera would change and must be corrected if resultant errors in the image position are significant.

It has been found that the accuracy of measurement of actual missile images under range operational conditions may be expected to be approximately 3 microns. With acceptable values for the linear expansion coefficients, it can be shown that the image position error at the edge of the field on the photographic plate would theoretically be about ⅓ micron per degree centigrade. It is apparent, then, that a 9 degree (16° F.) change of temperature can cause a significant error.

Referring to FIG. 10, it is apparent that, if a given point on the glass plate a distance $d$ from the camera axis of symmetry shifts an amount $\Delta d = C_g d \Delta T$, it would be desirable to have the image distance F shift an amount equal to $\Delta d / \tan_0$. This would compensate for the shift and a ray entering with a given angular coordinate would always fall on the same point on the photographic plate regardless of temperature.

This may be accomplished if the camera case material has the same coefficient of expansion as the glass of the photographic plate. Unfortunately, it has a greater value. So, if internal correction of the scale factor of the camera is desired, it is necessary to design the lens mount so that its expansion compensates for the excessive expansion of the case and moves the rear nodal point of the lens in such a way that the image distance, F, varies with a temperature coefficient equivalent to that of the glass of the photographic plate.

Then, since $C_L$ is greater than $C_c$ and $C_c$ greater than $C_g$;

$$C_c(F+L)\Delta T - C_L L \Delta T = C_g F \Delta T$$

dividing by $\Delta T$ and expanding;

$$C_c F + C_c L - C_L L = C_g F$$

Dividing by $-1$ and rearranging $$C_L L - C_c L = C_c F - C_g F$$

and (1) $$\frac{C_L - C_c}{C_c - C_g} = \frac{F}{L}$$

Similarly it can be shown for the fiducial mark projector mount that (2) $$\frac{C_A - C_c}{C_c - C_g} = \frac{B}{A}$$

With the material and dimensions of the projector mount, chosen in accordance with Equation 2, the fiducial marks will always appear at the same distance from the principal point on the photographic plate when measured at the same temperature regardless of the temperature at which they were photographed.

The effect on the focus of the image produced by compensating the scale factor of the camera is $\Delta F = C_g F \Delta T$ which, for $C_g = 8 \times 10^{-6}$, $F = 6.060$ inches and $\Delta T = 40°$ C., is 0.00194 inches which is within the depth of focus of the lens, found by measurement to be from 0.002 to 0.003 inches on axis.

The shift of the front nodal point relative to the intersection of the trunnion axis and azimuth axis of the mount due to the differential expansion of the lens mount and case is insignificant compared to the tolerance placed on the location of this point in the coordinates of the range geometry.

The camera case and back are preferably constructed of grey cast iron known as "Meehanite" which are heat treated before and after rough machining to relieve internal stresses while the lens mount and projector mounts, which have a higher coefficient of expansion, may be constructed of aluminum, such as 24St.

Obviously many modifications and variations of the present invention are possible in the light of the above teachings. It is therefore to be understood that within the scope of the appended claims the invention may be practiced otherwise than as specifically described.

What is claimed is:

1. A camera of the fixed focus type forming one of a pair of identical cameras fixed relative to the earth with their optical axes disposed upwardly at equal angles and intersecting at a point on a horizontal reference range line, for use in photographing the flight of a missile moving substantially parallel to said range line, comprising: a casing, a lens mount carried by the casing having a lens system affixed thereto, a plate carried by the casing having a photosensitive surface disposed in the focal plane of the lens system, and a pair of projector mounts carried by the casing having projectors adapted to project spaced points of light on the photo-sensitive surface to form fiducial marks thereon which marks establish a pair of reference points on said range line, the casing, lens mount, plate, and the pair of projector mounts being constructed of materials having coefficients of expansion such that the scale of an image on the plate, and the distance of fiducial marks from the optical axis of the lens system, measured at a predetermined temperature, remain constant irrespective of the temperature of the camera at the time of exposure.

2. A camera in accordance with claim 1 including a trunnion support for the casing adapted to permit pivotal adjustment of the casing about a horizontal axis, the front nodal point of the lens system being disposed on said axis and the optical axis being perpendicular to the trunnion axis.

3. A camera in accordance with claim 2 including support means for the trunnion support permitting rotation of said trunnion support about a vertical axis, and means associated with the lens mount for adjusting said nodal point to a position lying on said vertical axis.

4. A camera in accordance with claim 3 including three point support means for said last named support means, each of the three point support means being adjustable vertically and horizontally whereby the azimuth axis may be adjusted to an exact vertical position and the trunnion axis disposed horizontally at a predetermined distance above a reference plane.

5. Leveling apparatus comprising; a base plate adapted to be immovably affixed to the earth, a leveling plate adapted to be raised, lowered, leveled, and shifted horizontally, means for supporting the leveling plate above the base plate comprising three vertically movable screws, one disposed at each of the corners of a triangle and axialy movable relative to one of said plates and adapted to be rigidly affixed thereto at a desired position of adjustment, a pair of rectilinearly relatively slideable blocks disposed between one end of each screw and one of said plates, one of each pair of blocks having a ball receiving socket therein, a ball engaging said socket and a like socket in a screw, and means for adjusting the other block of each pair relative to the leveling plate in a horizontal direction substantially normal to the direction of relative motion between the blocks.

6. Apparatus in accordance with claim 5 including a member supported above said leveling plate, and means permitting adjustment of said member in a horizontal plane and relative to said leveling plate and for securing the former to the latter in a desired position, whereby a vertical reference axis of said member may be shifted in any vertical plane in space.

7. Apparatus in accordance with claim 6 wherein said member comprises a camera having a nodal point lying on said vertical reference axis.

8. Apparatus in accordance with claim 7 including means for adjusting said camera relative to said leveling plate about a horizontal axis passing through said nodal point.

References Cited in the file of this patent

UNITED STATES PATENTS

| | | |
|---|---|---|
| 210,645 | Thompson | Dec. 10, 1878 |
| 1,971,486 | Jennings | Aug. 28, 1934 |
| 2,562,312 | Gregory | July 31, 1951 |
| 2,649,835 | Lierley | Aug. 25, 1953 |
| 2,726,834 | Hoge | Dec. 13, 1955 |
| 2,796,800 | Klemperer | June 25, 1957 |
| 2,812,698 | Tiranti | Nov. 12, 1957 |